United States Patent [19]

Samejima et al.

[11] Patent Number: 5,239,812
[45] Date of Patent: Aug. 31, 1993

[54] FRAME STRUCTURE FOR A FRONT MOWER

[75] Inventors: Kazuo Samejima; Yoshihiro Kawahara; Shigeru Morita; Terutaka Takei; Yoshikazu Togoshi, all of Sakai, Japan

[73] Assignee: Kubota Corporation, Osaka, Japan

[21] Appl. No.: 846,841

[22] Filed: Mar. 6, 1992

[30] Foreign Application Priority Data

Mar. 19, 1991 [JP] Japan ................................. 3-54236

[51] Int. Cl.⁵ .......................................... A01D 34/64
[52] U.S. Cl. .............................. 56/15.6; 56/DIG. 22; 180/900
[58] Field of Search ................ 56/15.6, 15.4, 14.7, 56/DIG. 6, DIG. 22; 180/900, 242

[56] References Cited

U.S. PATENT DOCUMENTS

| | | | |
|---|---|---|---|
| 4,787,646 | 11/1988 | Kamlukin et al. | 56/DIG. 22 X |
| 4,887,686 | 12/1989 | Takei et al. | 180/211 |
| 5,090,512 | 2/1992 | Mullet et al. | 56/DIG. 22 X |
| 5,123,805 | 6/1992 | Ishimori et al. | 56/DIG. 22 X |

FOREIGN PATENT DOCUMENTS 2178290 2/1987 United Kingdom .

Primary Examiner—Terry Lee Melius
Attorney, Agent, or Firm—Edwin E. Greigg; Ronald E. Greigg

[57] ABSTRACT

A front mower having a grass cutting unit connectable to a front portion and a grass catcher connectable to a rear portion thereof, comprises a main frame structure extending longitudinally of a mower body. The main frame structure includes a pair of right and left front frames and a pair of right and left rear frames. The rear frames have front ends thereof connected to rear ends of the front frames, respectively, such that the rear frames are lower in level than the front frames. A lower auxiliary frame structure is suspended from the main frame structure. Front wheels and rear wheels are supported by the main frame structure. Axles of the rear wheels are swivelable about a vertical axis in a caster-like way to steer the mower. An engine is disposed in a region of the front frames between the front wheels and rear wheels and supported by the lower auxiliary frame structure. The engine and oil pan are disposed above the lower auxiliary frame structure. A driver's seat is disposed above the front frames. A fuel tank is disposed in a region of the rear frames.

6 Claims, 3 Drawing Sheets

FRAME STRUCTURE FOR A FRONT MOWER

BACKGROUND OF THE INVENTION

1. Field of the Invention

The present invention relates to a riding front mower having a grass cutting unit connectable to a front portion and a grass catcher connectable to a rear portion thereof, and particularly to such a front mower having dirigible rear wheels.

2. Description of the Related Art

This type of front mower has the advantages that its excellent steerability enables the mower easily to engage in a grass cutting operation while running near trees and the like and that the ground under a grass cutting treatment may be visually observed to facilitate the operation. Generally, however, this type of mower has a relatively high center of gravity of its body since the engine is mounted on a rearward portion of the body above the dirigible rear wheels. Consequently, compared with other types of mower, this type of mower lacks in stability when running on inclined terrains. Further, since the engine is disposed close to axles of the dirigible rear wheels, a problem of space is encountered when, for example, an attempt is made to employ what is known as a caster type steering structure for swiveling the rear wheels about a single vertical axis. To solve this problem, a proposal has been made in U.S. Pat. No. 4,887,686 to place the engine in a lower forward position. However, a grass cutting operation still appears to be more or less difficult with this mower since the engine is not sufficiently low and a driver's seat is on an elevated level above the engine.

SUMMARY OF THE INVENTION

An object of the present invention is to provide a frame structure for a riding front mower having a grass cutting unit connected to a front portion and a grass catcher connected to a rear portion thereof, which allows the engine to be disposed at a sufficiently low level, thereby allowing a maneuvering floor to be disposed in an appropriate position, and which supports the engine and floor steadily and reliably.

The above object is fulfilled, according to the present invention, by a front mower comprising:

a frame structure extending longitudinally of a mower body and including a pair of right and left front frames and a pair of right and left rear frames, the rear frames having front ends thereof connected to rear ends of the front frames, respectively, such that the rear frames are lower in level than the front frames;

a lower auxiliary frame structure suspended from the frame structure extending longitudinally of the mower body;

front wheels supported by the frame structure;

dirigible rear wheels supported by the frame structure;

an engine disposed in a region of the front frames between the front wheels and the rear wheels and supported by the lower auxiliary frame structure; and a fuel tank disposed in a region of the rear frames.

With this construction, the heavy engine is disposed below the front frames on which a maneuvering floor may be mounted. A grass catcher may be mounted on the rear frames arranged lower in level than the front frames.

In a preferred embodiment of the present invention, the engine has an air cleaner and a radiator arranged rearwardly thereof, and a water filling tap of the radiator and the air cleaner are disposed above the rear frames. According to this construction, access may be made with ease to the parts requiring maintenance relatively frequently such as replenishment of cooling water and change of cleaner element. Such operations may be carried out with ease even if these parts are covered by a rear hood, by opening and closing the hood.

Other objects and features of this invention will be understood from the following description to be had with reference to the accompanying drawings.

DETAILED DESCRIPTION OF THE PREFERRED EMBODIMENT

Figure 1:
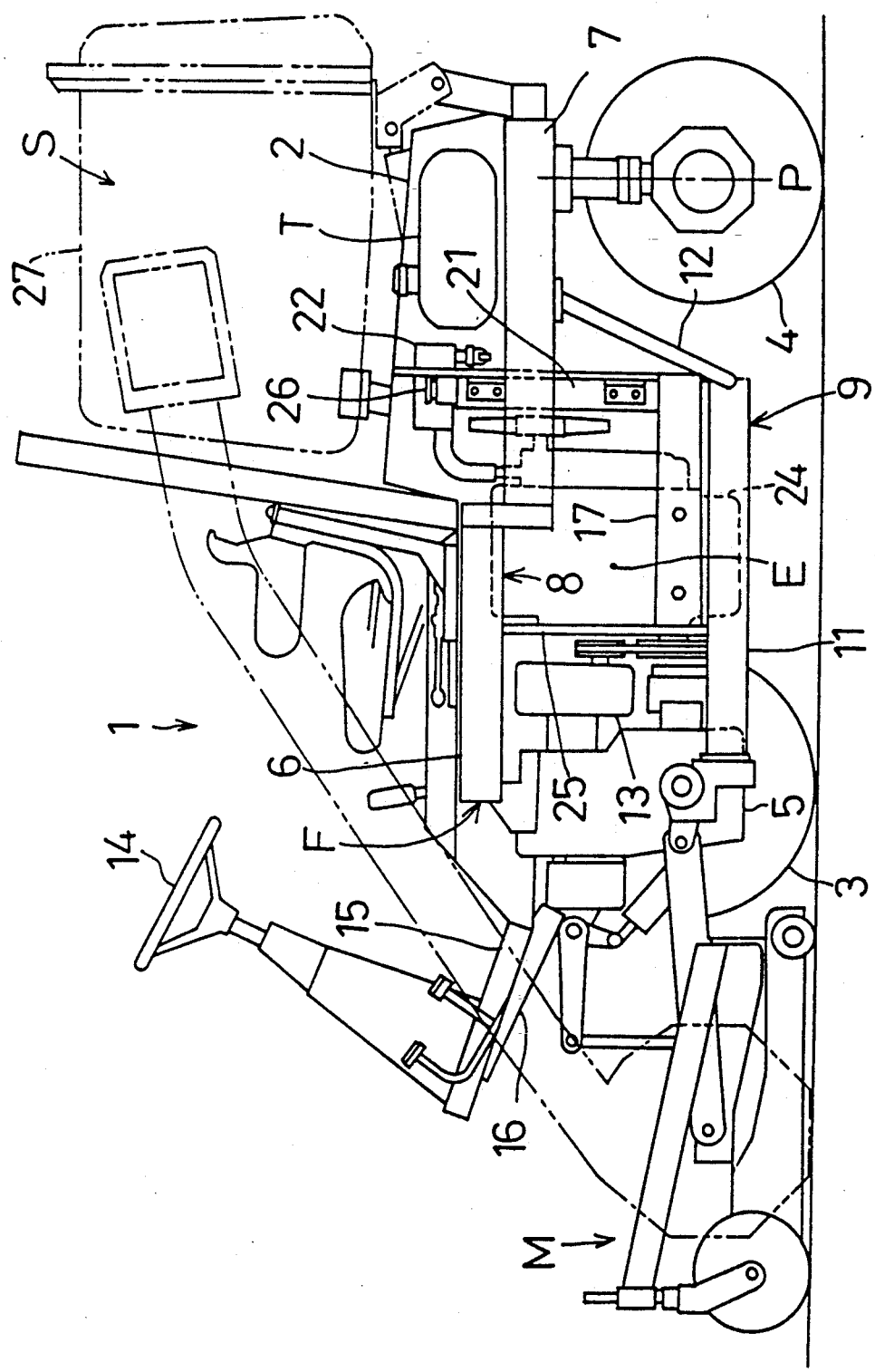
FIG. 1 is a side elevation of a front mower according to the present invention.

FIG. 1 shows a riding front mower having a mower or grass cutting unit M vertically movably connected to the front of a vehicle body, a driver's section 1 disposed on a front portion of the vehicle body, a rear hood 2 disposed rearwardly thereof, and a grass catcher 27 mounted in a load accommodating space S above the rear hood 2. This mower also has front wheels 3 which are driving wheels, and rear wheels 4 which are dirigible.

The right and left front driving wheels 3 are supported by a transmission case 5 secured to a front end of a body framework F. The right and left dirigible rear wheels 4 are disposed in a space below a rear end of the body framework F for swiveling about a single vertical axis P. Details of the body framework F will be described next.

Figure 2:
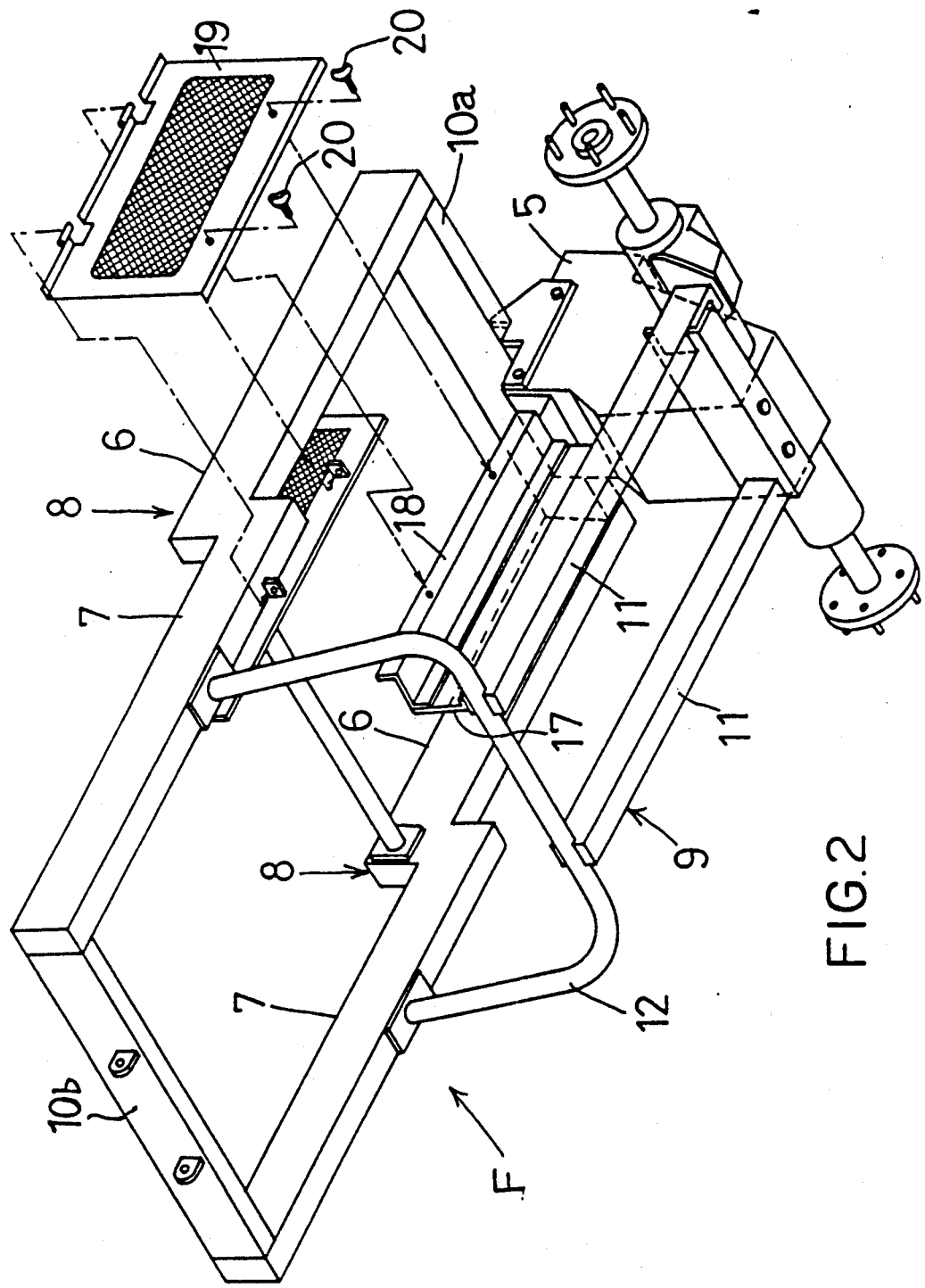
FIG. 2 is a perspective view of a frame structure.

As shown in FIGS. 1 and 2, the body framework F includes a pair of right and left main frames 8 formed of square pipes, and a lower framework 9. Each of the main frames 8 includes a front frame section 6 and a rear frame section 7 exhibiting a stepped structure in side view. The main frames 8 are interconnected at front ends and at rear ends thereof through a front cross frame 10a and a rear cross frame 10b respectively, both formed of a square pipe. The transmission case 5 is bolted to and suspended from the front cross frame 10a. A pair of right and left lower horizontal frames 11 formed of square pipes have front ends thereof bolted to lower portion of the transmission case 5. Rear ends of the lower horizontal frames 11 are interconnected through a round pipe frame 12 which is U-shaped in front view and which is bolted to the rear frame sections 7. An engine E is mounted on the lower frame 9 including the round pipe frame 12 and the lower horizontal frames 11, to be below the main frames 8. The engine E has a lower portion covered by an oil pan 24 not exposed below the lower frame 9. Thus, the lower frame 9 prevents the oil pan 24 from being damaged by obstacles and the like on the road.

Power of the engine E is transmitted through a hydrostatic transmission 13 to the transmission case 5 forming part of a propelling system. The driver's section 1 includes a steering wheel 14 and steps 15 which are supported by a floor frame 16 bolted to the transmission case 5. A driver's seat is mounted on the front frame sections 6.

The engine E is mounted on the lower horizontal frames 11 through brackets 17 secured to upper surfaces of the lower horizontal frames 11 and extending longitudinally thereof (In FIG. 2, only one of the two, right and left brackets 17 is shown for facility of illustration). Lower cover elements 18 are secured to these brackets 17, and side covers 19 are removably attached to these cover elements 18 and rear frame sections 7. Specifically, the side covers 19 are attached to the rear frame sections 7 by pins and bores, and to the lower cover elements 18 by wing bolts 20.

Figure 3:
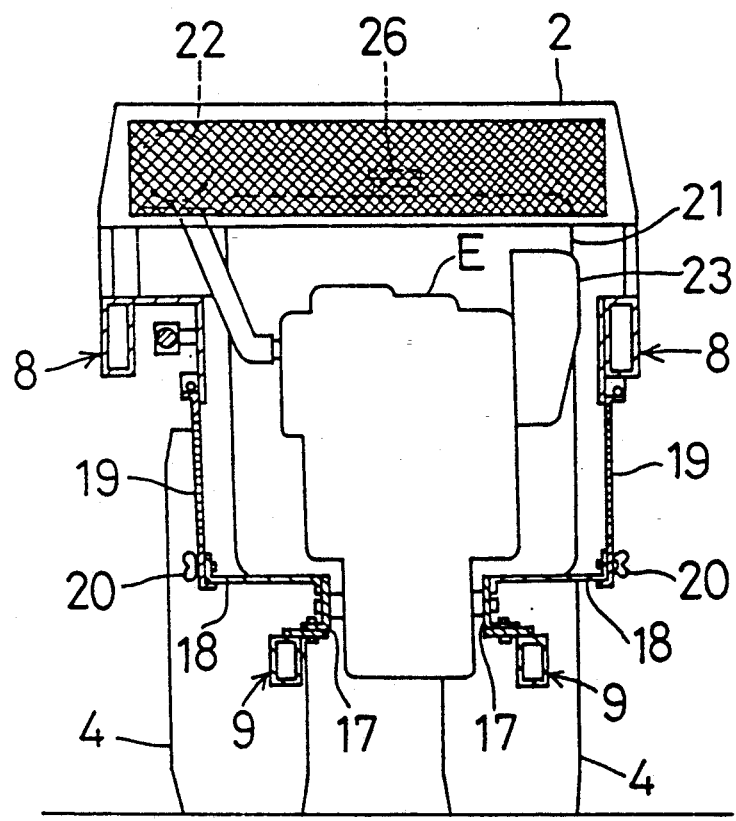
FIG. 3 is a rear view showing the frame structure, an engine and a rear hood.

The engine E has a radiator 21, an air cleaner 22 and a muffler 23 connected thereto. As shown in FIG. 3, a water filling tap 26 of the radiator 21, the air cleaner 22 and a fuel tank T are disposed above the rear frame sections 7 and contained in the rear hood 2. Transverse dimensions are set such that the engine E preassembled with these auxiliary devices is allowed to fall between the right and left main frames 8 to be mounted on the lower frame 9. Numeral 25 denotes a front cover for covering the front of the engine E.

What is claimed is:

1. A front mower having a grass cutting unit connectable to a front portion and a grass catcher connectable to a rear portion thereof comprising:

a main front and rear frame structure extending longitudinally of a mower body including a pair of right and left front frames on a horizontal plane, a pair of right and left rear frames on a horizontal plane, said rear frames having front ends thereof connected to rear ends of said front frames, respectively, such that said rear frames are on a lower level horizontally than said front frames;

a lower auxiliary frame structure suspended from said front and rear main frame structure including a U-shaped frame (12) mounted onto a lower part of said rear frames (7) and interconnecting said right and left rear frames, spaced lower horizontal frames (11) connecting at their rear ends to said U-shaped frame (12) and extending horizontally therefrom;

a connecting means for connecting the front ends of said lower horizontal frames to said lower auxiliary frame structure;

front wheels supported by said main frame structure;

dirigible rear wheels supported by said connecting means;

an engine disposed substantially within a space formed by said U-shaped frame, said lower horizontal frames, said connecting means and said front frames are assembled such that an access to said engine from its sides is permitted and said engine is supported by said lower auxiliary frame structure; and a fuel tank is disposed in a region of said rear frames.

2. A front mower as claimed in claim 1, wherein said engine has an air cleaner and a radiator arranged rearwardly thereof, a water filling tap of said radiator and said air cleaner projecting above said rear frames.

3. A front mower as claimed in claim 1, wherein said engine is disposed below said front frames, with a driver's seat provided said front frames.

4. A front mower as claimed in claim 1, wherein said front wheels are driven by said engine, and said rear wheels have axles swivelable about a vertical axis by a steering wheel to steer the front mower, said axles of said rear wheels being disposed adjacent said rear frames.

5. A front mower as claimed in claim 1, wherein said fuel tank is disposed above said rear frames, and said grass catcher is disposed above said fuel tank.

6. A front mower as claimed in claim 1, wherein said connecting means include a transmission case.

* * * * *